US007444583B2

(12) United States Patent
Aronson et al.

(10) Patent No.: US 7,444,583 B2
(45) Date of Patent: Oct. 28, 2008

(54) STANDARD GRAPHICS SPECIFICATION AND DATA BINDING

(75) Inventors: David Floyd Aronson, Woodinville, WA (US); Paul L. Bleisch, Sammamish, WA (US); Daniel Paul Horowitz, Thousand Oaks, CA (US); Jonathan Thomas Steed, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 431 days.

(21) Appl. No.: 11/139,935

(22) Filed: May 27, 2005

(65) Prior Publication Data

US 2006/0271842 A1 Nov. 30, 2006

(51) Int. Cl.
*G06F 17/00* (2006.01)
(52) U.S. Cl. ...................................................... 715/200
(58) Field of Classification Search ................. 715/500, 715/512, 530, 200, 230, 232; 345/568
See application file for complete search history.

(56) References Cited

U.S. PATENT DOCUMENTS

| 5,794,016 | A  | * | 8/1998  | Kelleher ..................... 345/505 |
| 5,946,005 | A  | * | 8/1999  | Chiang et al. ................ 345/544 |
| 5,987,555 | A  | * | 11/1999 | Alzien et al. ................. 710/312 |
| 5,999,198 | A  | * | 12/1999 | Horan et al. ................. 345/531 |
| 6,279,087 | B1 | * | 8/2001  | Melo et al. ................... 711/146 |
| 6,650,332 | B2 | * | 11/2003 | Doyle et al. ................. 345/532 |
| 6,839,062 | B2 |   | 1/2005  | Aronson et al. ............. 345/522 |
| 6,873,328 | B2 | * | 3/2005  | Vienneau et al. ............ 345/473 |
| 7,032,182 | B2 | * | 4/2006  | Prabhu et al. ................ 715/805 |
| 2002/0075271 | A1 | * | 6/2002  | Doyle et al. ................. 345/531 |
| 2004/0181548 | A1 | * | 9/2004  | Thomas et al. ............ 707/104.1 |
| 2005/0034062 | A1 | * | 2/2005  | Bufkin et al. ................ 715/512 |
| 2005/0086591 | A1 | * | 4/2005  | Savekar ....................... 715/512 |
| 2005/0140687 | A1 | * | 6/2005  | Kulkarni ...................... 345/568 |
| 2005/0237329 | A1 | * | 10/2005 | Rubinstein et al. .......... 345/531 |
| 2005/0251787 | A1 | * | 11/2005 | Dietrich et al. .............. 717/107 |
| 2006/0059566 | A1 | * | 3/2006  | Rastas .......................... 726/27 |
| 2006/0082577 | A1 | * | 4/2006  | Carter ......................... 345/426 |
| 2007/0011171 | A1 | * | 1/2007  | Nurminen et al. ............. 707/10 |
| 2007/0112874 | A1 | * | 5/2007  | Carol et al. .................. 707/200 |

OTHER PUBLICATIONS

Gorke et al., Live Graphics Gems as a Way to Raise Repositories for Computer Graphics Education, ACM Jul. 2005, pp. 1-8.*
Nanard et al., IUHM, A Hypermedia-Based Model for Integrating Open Services, Data and Metadata, ACM 2003, pp. 128-137.*
Voorhies et al., Virtual Graphics, ACM Aug. 1988, pp. 247-253.*

* cited by examiner

*Primary Examiner*—Cong-Lac Huynh
(74) *Attorney, Agent, or Firm*—Woodcock Washburn LLP

(57) ABSTRACT

A standard graphics specification for use by both developers of graphics files as well as of applications developed to execute in a runtime environment is disclosed. The graphics files are developed to conform to the graphics specification and therefore will be executable by applications in any runtime environment that likewise conform to the graphics specification. The specification includes program syntax standards and standards for metadata in the form of semantics and annotations that further describe the code. The specification additionally includes standards to which applications may conform to ensure that the applications will be capable of executing any graphics files that conform to the graphics specification.

27 Claims, 6 Drawing Sheets

STANDARD GRAPHICS SPECIFICATION AND DATA BINDING

FIELD OF THE INVENTION

The invention generally relates to rendering graphic displays and specifically to standardizing graphics files and runtime environments to promote compatibility between the two.

BACKGROUND OF THE INVENTION

A graphics application may be executed on a computer and may result in rendering a graphic display on a computer monitor or other display. The graphics application may include program code for various aspects related to the rendering. For example, one part of the program code may be related to mesh, another part may be related to lighting, and another part may be related to texture. To render a graphic on a display, the program code may be sent from a graphics file to a video card and may include a pixel, vertex, and other types of shader as well as values for the render state, mesh, lighting, and texture, which are consumed by the shaders. The graphics file thus includes a structure for setting the state of the video card and the code and data used for the rendering. The graphics file may include names for related portions of the section of data. For example, one section may be "WorldMatrix," another "lightArray" and another "color."

Generally, various graphics applications may perform similar functions when rendering an image. For example, a vertex shader program may include data for a world matrix, view matrix, and projection matrix. A problem exists because there may be no standardization for the names of the various sections of data in the graphics file. For example, graphics programmers may want to share graphics files, but there may be no standard naming protocol to indicate to a programmer which data represents a world matrix, which represents a view matrix, and which represents a projection matrix. This is true of other aspects of rendering an image, such as with texture, lighting, and color, for example. An application may not be able to use a graphics file that was not specifically written for the application because the application may not be able to discern which values to set into what named section of the graphics file's data section.

Therefore, there is a need for a standardization of graphics files and runtime environments such that a graphics file developed independent of and without regard to a particular runtime environment may be executed in that runtime environment without requiring modification or study.

SUMMARY OF THE INVENTION

The invention includes using a standard graphics specification based on communication through metadata in the development of both graphics files made to execute in a runtime environment and an application as a hosting environment. The graphics files may be developed independent of any application and naming convention and then marked up with metadata to conform to the graphics specification and therefore will be executable by applications with runtime environments that likewise conform to the graphics specification. The specification may establish metadata syntax standards that further describe the code. The specification additionally may provide standards to which applications may conform to ensure that the applications will be capable of executing any graphics files that conform to the graphics specification.

The standard graphics specification may additionally include a data binding regime to enable a graphics file that is compliant with the graphics specification to bind parameters of a shader to values provided by an application without user intervention. The graphics file requests metadata values by supplying a virtual address path. The application may obtain virtual address paths of the requested values from the graphics files, and may map the virtual address paths to actual address paths for retrieval of the appropriate values. The conversion of virtual to actual address paths can be assigned reasonable defaults or be user assisted. Virtualization of bind addresses in a graphics file may occur, but is not limited to, the instantiation, duplication, instancing, referencing, or other methods of reuse of the graphics file.

BRIEF DESCRIPTION OF THE DRAWINGS

The foregoing summary and the following detailed description of the invention are better understood when read in conjunction with the appended drawings. Embodiments of the invention are shown in the drawings, however, it is understood that the invention is not limited to the specific methods and instrumentalities depicted therein. In the drawings.

DETAILED DESCRIPTION OF ILLUSTRATIVE EMBODIMENTS

Example Computing Environment

Figure 1:
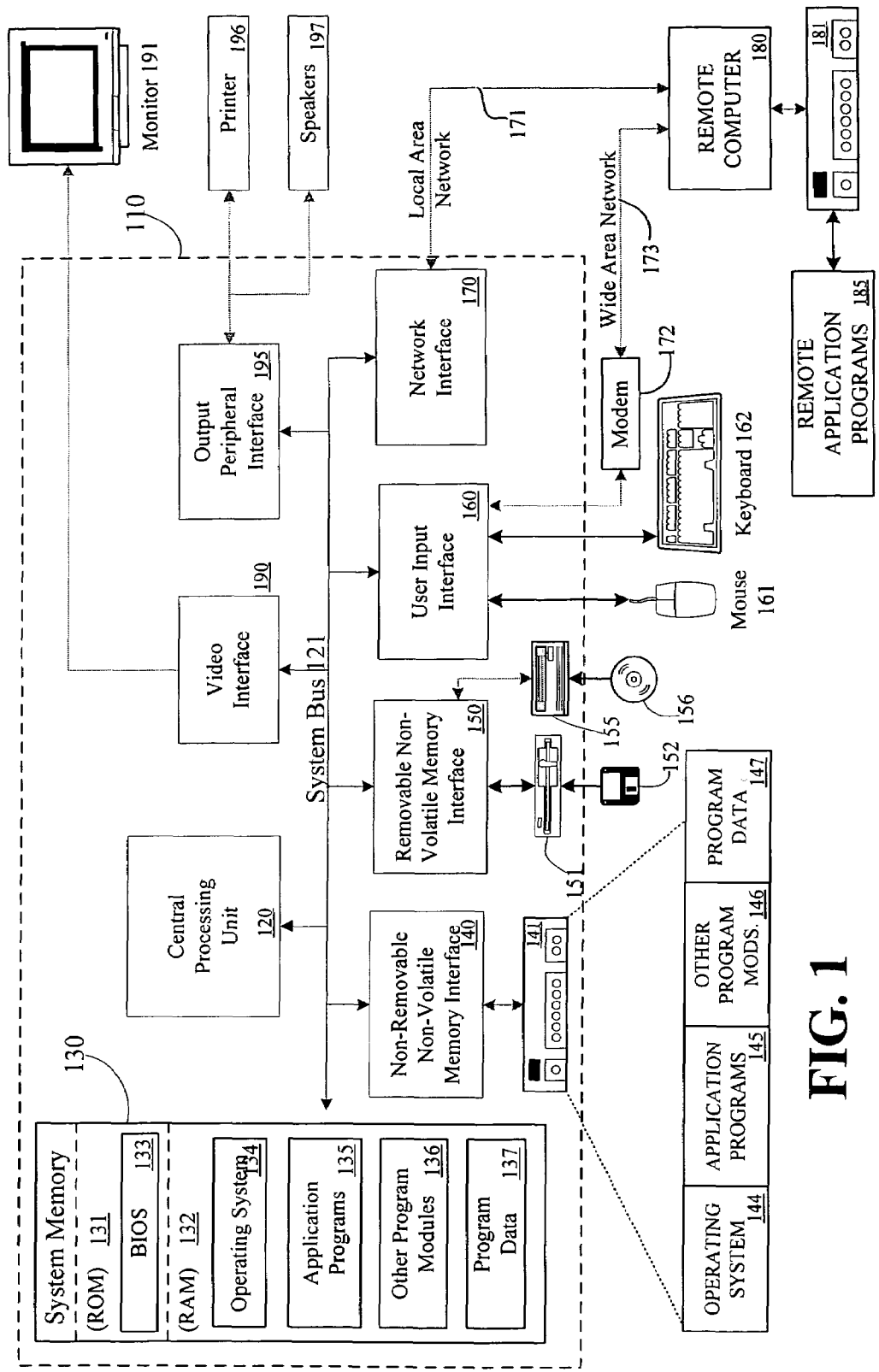
FIG. 1 is a block diagram showing an example computing environment in which aspects of the invention may be implemented.

FIG. 1 and the following discussion are intended to provide a brief general description of a suitable computing environment 100 in which an example embodiment of the invention may be implemented. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, hand-held computers, programmable consumer electronics, multimedia consoles, game consoles, satellite receivers, set-top boxes, automated teller machines, arcade games, mobile telephones, personal digital assistants (PDAs) and any other processor-based system or machine. The term "data" refers to any information of any form, including commands, transfers, notifications, or requests. The terms "program code" and "code" refer to any set of instructions that are executed or otherwise processed by a processor.

While a general purpose computer is described below, this is merely one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 illustrates an example of a suitable computing system environment 100 in which the invention may be implemented, although as made clear above, the computing system environment 100 is only one example of a suitable-computing environment and is not intended to suggest any limitation as to the scope of use or functionality of the invention. Nor should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a central processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above are also included within the scope of computer readable media.

The system memory 130 includes computer storage media in the form of volatile and/or nonvolatile memory such as ROM 131 and RAM 132. A basic input/output system 133 (BIOS) containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

A computer 110 or other client device can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Example Embodiments

Figure 2:
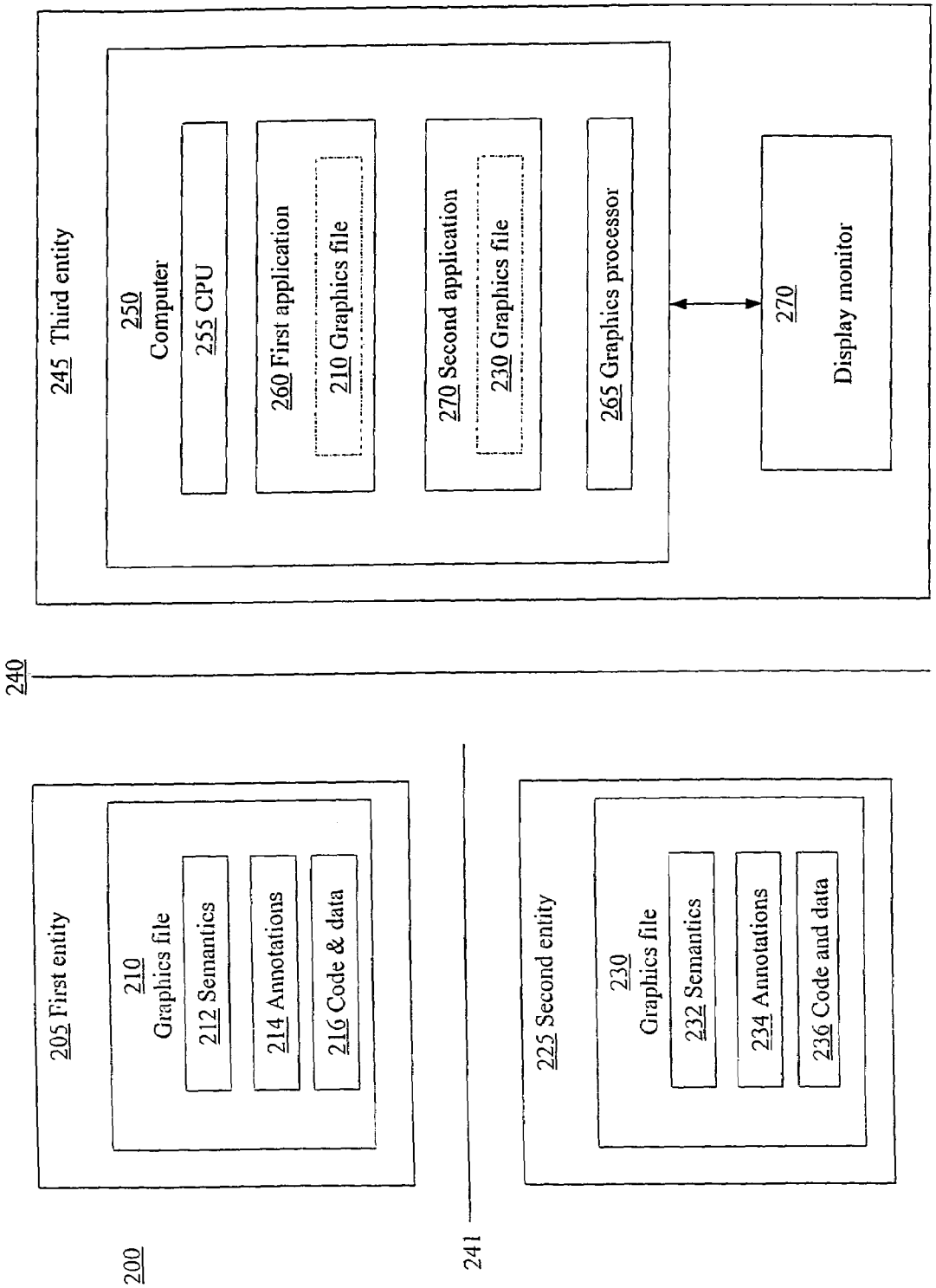
FIG. 2 is a block diagram of an example system for providing a standardized specification that enables compatibility between independently-developed graphics files and runtime environments.

FIG. 2 is a block diagram of an example system 200 for providing compatibility between independently-developed graphics files and runtime environments. The system 200 may include a first entity 205, a second entity 225, and a third entity 245. Each of the first, second, and third entities 205, 225, 245 may be independent of the other and have no, limited, or full knowledge of the other entities in the system 200. The lines 240, 241 denote that each of the first second, and third entities 205, 225, 245, while included for explanatory purposes in the system 200, may act independently of each other to perform its role in the system 200. Each of the entities 205, 225, 245 does not need to know anything, according to one embodiment of the invention, about the other entities in the system 200.

The first entity 205 may be, for example, a graphics developer or a game developer that develops a graphics file 210. The graphics file 210 may be any file including information that, when executed, provides or facilitates rendering a primitive or other graphic on a display associated with a runtime environment. The graphics file 210 may include for example, a pixel shader and/or a vertex shader. A pixel shader refers to program code that, when executed, such as by a graphics processor, processes pixels for rendering. The graphics processor, for example, may execute a pixel shader, applying information to pixels on a per-pixel basis in preparation for rendering on a display. A vertex shader refers to program code that, when executed, manipulates vertex data values, typically in three dimensional space. The vertex data may include information associated with color, texture coordinates, orientations in space, point size, or other data specific to its calculation.

The graphics file 210 may include semantics 212, annotations 214, and other code and data 216 written consistent with a standard graphics specification. The code and data 216 may include parameters or other information for execution of the graphics file 210. The parameters may include pieces of code and data necessary for executing, for example, the pixel or vertex shader of the graphics file 210. The parameters thus represent various attributes of the graphics file 210.

The term "semantic" refers to metadata that may be a connection or tag for parameter information in a graphics file. Semantics may be placed on parameters such that they are invisible to a graphics file but visible to an application executing the graphics file. The term "annotation" refers to metadata that includes information providing named data to applications or program code that set and use parameters of the graphics file 210. Thus semantics 212 and annotations 214 provide a metadata facility for a graphics file 210 so that an author may advertise the intent or grammar of a parameter to an application attempting to provide a value for the parameter, though the semantics 212 and annotations 214 are not restricted solely to this use. Other metadata mechanism may exist beyond these definitions of annotations and semantics. Though this invention describes an implementation built upon semantics and annotations, it may be applied to any metadata system. The standard graphics specification may establish the syntax for the semantics and annotations such that a runtime environment, for example, that uses the standard graphics specification will understand the program code.

The graphics file 210 may be developed by the first entity 205, and the first entity 205 may intend that the graphics file 210 be used in a runtime environment by some other entity such as the third entity 245. The first entity 205, however, may have no information regarding the runtime environment of the third entity 245. Instead, the first entity 205 includes the semantics 212 and the annotations 214 along with the code and data 216 and knows that, if the third entity 245 likewise implements a runtime environment that recognizes the semantics 212 and annotations 214, then the graphics file 210 may execute the code and fill the data 216 appropriately at the computer 250 of the third entity 245. Thus, the semantics 212 and annotations 214 are standardized and known by both the first entity 205 in developing the graphics file 210 and by the third entity 245 who is implementing a runtime environment on the computer 250. Therefore, while the first entity 205 may not know at the time of creating the graphics file 210 where the graphics file 210 will end-up, the first entity 205 knows that any runtime environment that uses the standard graphics specification and thus knows the meaning of the semantics 212 and annotations 214 will be able to execute the graphics file 210 and manipulate the code and data 216 within the graphics file 210.

The second entity 225 likewise may be a graphics or game developer and may develop a graphics file 230. The graphics file 230 may include semantics 232, annotations 234, and code and data 236 as described above with regard to the graphics file 210. The second entity 225 may be independent of the first entity 250 and indeed may not even know of the existence of the first entity 205. Likewise, the second entity 205 may not know the identity or existence of the third entity 245. The second entity 225, however, may include in the graphics file 230 the semantics 232 and annotations 234 that are recognized by the first and second applications 260, 270 of the third entity 245. The second entity 225 may be assured that some runtime environment will be able to execute the graphics file 230 because the graphics file 230 was developed using the standard graphics specification and thus the semantics 232 and annotations 234 will be recognized by runtime environments.

The semantics 212 and annotations 214 of the graphics file 210 may be substantially the same as the semantics 232 and annotations 234 of the graphics file 230 because both files 210, 230 may have been developed using the standard graphics specification for such semantics 212, 232 and annotations 214, 234. The runtime environment of the computer 250 likewise may recognize the semantics 212, 232 and annotations 214, 234 because it too may implement the standard graphics specification.

The third entity 245 may be any end user or other entity implementing the graphics file 210 or the graphics file 235. The third entity 245 may include the computer 250. The computer 250 may include a central processing unit 255, a first application 260, a second application 270 and a graphics processor 265. The graphics processor 265 may be implemented using a video card or by any other appropriate means or method. The first and second applications 260, 270 may be any application, program, or program code that uses or can execute or cause to be executed a graphics file such as the graphics files 210 or 225. The third entity 245, computer 250 or first application 260 may obtain and execute the graphics file 210. The computer 250 or the first application 260 may cause the graphics file 210 to be executed, such execution being accomplished in part because the computer 250 or the first application 260 is versed in the semantics 212 and annotations 214 of the graphics file 210. That is, the runtime environment of the computer 250 was developed using, in part, the standard graphics specification and thus "understands" the semantics 212 and annotations 214 of the graphics file 210.

Likewise, the computer 250 or the second application 270 may cause the graphics file 210 to be executed, such execution being accomplished in part because the computer 250 or the second application 270 was developed using, in part, the standard graphics specification. That is, the runtime environment of the computer 250 "understands" the graphics file 230 because it "understands" the semantics 232 and annotations 234. Thus, the computer 250 may be capable of executing the graphics files 210, 230 or any other graphics files that likewise conform to the standard graphics specification.

The computer 250 or the first or second applications 260, 270 may "understand" the semantics 212, 232 and annotations 214, 234 because the standard graphics specification establishes and defines expected behavior of the applications 260, 270. For example, the first and/or second applications 260, 270 may be capable of supplying the application values. The application values may be made available to the respective graphics files 210, 230 so that the graphics files 210, 230 may leverage them at runtime. Thus, the standard graphics specification used by the first and second entities 205, 225 to develop the graphics files 210, 230 with semantics 212, 232 and annotations 214, 234 may also be used by the third entity 245, the computer 250, or the first or second applications 260, 270 to use the appropriate application values compatible with the graphics files 210, 230.

Figure 3:
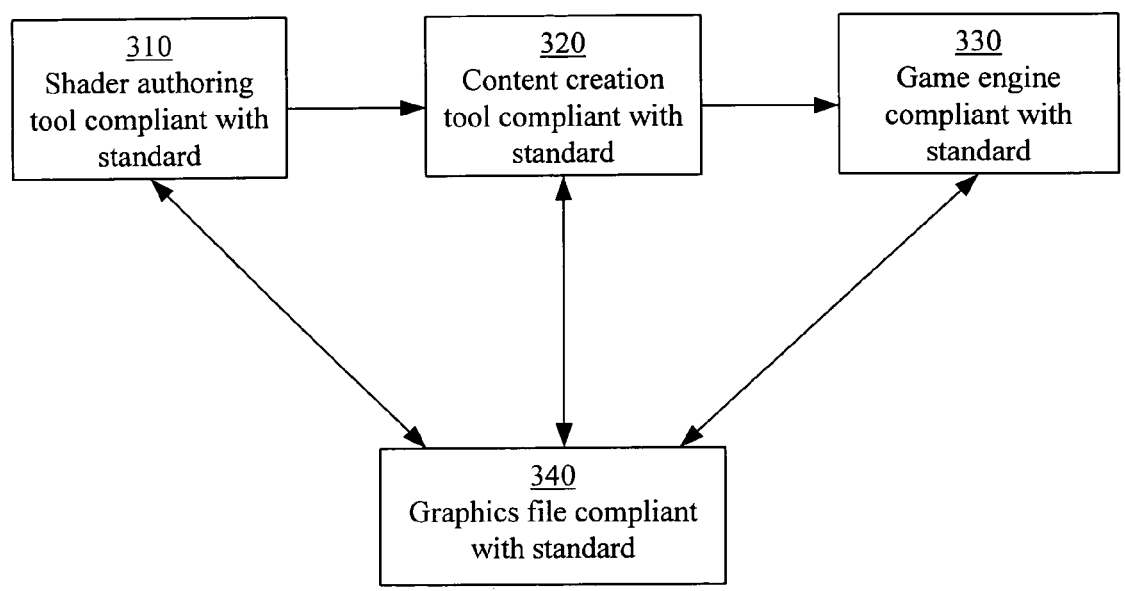
FIG. 3 is block diagram of a pipeline for using a graphics file and applications, all of which may be compliant with a standard graphics specification.

FIG. 3 is a high level block diagram of a pipeline for using a graphics file 340 and applications 310, 320, 330, all of which may be compliant with a standard graphics specification that establishes standard methodology and terminology for developing graphics files and graphics applications. That is, the graphics file 340 may conform to the structure, annotation, and semantic grammar set out in the standard graphics specification, and the applications 310, 320, 330 each may conform to a certain manner of, for example, supplying application values available to respective graphics files so that the graphics files may leverage them at runtime.

The applications 310, 320, 330 may be considered host applications, in that each is executed on a host such as, for example, the computer 110 described with regard to FIG. 1. Each of the applications 310, 320, 330 may use any graphics file that is compliant with the standard graphics specification. For example, an application for shader authoring tools 310 may implement the graphics file 340 so that authors can create specification-compliant graphics for use in a game. Such shader authoring tools include, for example and not by way of limitation, FX Composer produced by NVIDIA, Inc., of Santa Clara, Calif., RenderMonkey™ produced by ATI Technologies, Inc., of Santa Clara, Calif., RT/shader produced by RTzen, Inc., of Bellevue, Wash., or ShaderWorks™ produced by Mad Software, Inc.

An application for content creation tools 320 may implement the graphics file 340 so that, for example, users can assign graphics as materials on objects in a scene and obtain reasonable behavior. Such content creation tools include, for example and not by way of limitation, 3DS max®, produced by Autodesk, Inc., of San Francisco, Calif., Maya® produced by Alias Systems Corp. of Toronto, Canada, Photoshop® produced by Adobe Systems, Inc., of San Jose, Calif., and XSI® produced by Softimage, Co., of Montreal, Canada. Finally, game engines 330 may implement the standard graphics specification so that non-programmers can plug the graphics file 340 into a game without a software programmer or more expert intervention. A game engine 330 may include any third party render engines. Thus the standard graphics specification may be implemented by both graphics file developers and application developers such that each may develop their own environment (graphics file or host runtime environment) with an assurance of compatibility to render graphic displays. The standard graphics specification may be viewed, for example, as a quasi-contract between host applications 310, 320, 330 and the graphics file 340 by providing common term definitions and defining interconnections. The "contract" being that, if the host applications 310, 320, 330 implement the standard graphics specification, then each will be capable of understanding and executing a graphics file that also conforms to the specification, and vice versa.

Figure 4:
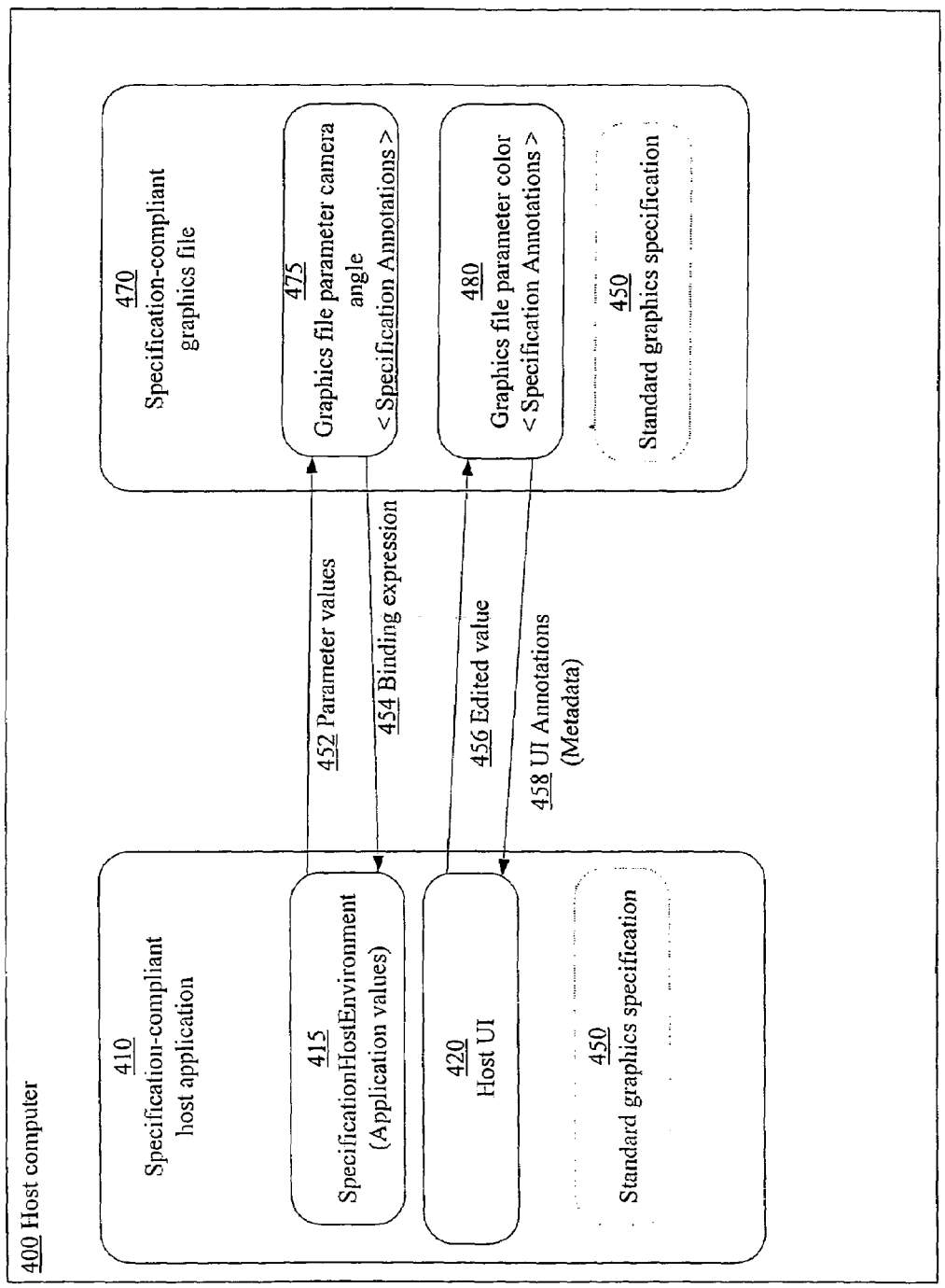
FIG. 4 is a block diagram of a host computer depicting an overview of an application rendering via a graphics file, according to the invention.

FIG. 4 is a block diagram of a host computer 400 depicting an overview of an application rendering via a graphics file, according to the invention. The host computer 400 may include a graphics application 410 and a graphics file 470. The graphics application 410 may conform to a standard graphics specification 450, denoted by dotted lines around the standard graphics specification 450. That is, the graphics application 410 may conform to the standard graphics specification 450 but does not necessarily include the specification 450. The graphics file 470 may be any graphics file that is compliant with the standard graphics specification 450. It should be noted that an existing graphics file may become specification-compliant by adding, for example, metadata listed in the specification to the file. The host application 410 and the graphics file 470 may be developed by different entities that are unaware of the other. Each entity, however, may know that using the standard graphics specification 450 helps ensure that their product (i.e., the host application 410 or the graphics file 470) will be compatible with other products developed using the same standard graphics specification 450.

In conforming with the standard graphics specification 450, the graphics application 410 may expose a user interface 420 for receiving values from a user when, for example, a rendering will be completed involving the specification-compliant graphics file 470 with specification-compliant metadata the requests user interface controls. That is, the graphics file 470 may expose, through the application, certain metadata to the user of the host application 410, enabling the user to provide values for the parameters. The user may therefore be able to specify, for example, the color or shininess of an object to be rendered during execution of the graphics file 470. Because the host application 410 and the graphics file 470 are compliant with the standard graphics specification 450, the graphics application 410 "knows" how to expose the user interface 420 and to provide values to the parameters established in the graphics file 470.

The graphics file 470 may include metadata associated with graphics file parameter color 480. For example, when the graphics application 410 reads the graphics file 470, the graphics application 410 finds UI metadata 458 in the graphics file 470, which indicates to the graphics application 410 to query the user for a value for the graphics file parameter color 480. The graphics application 410 understands the UI metadata 458 from the graphics file 470, exposes a user interface 470 consistent with the metadata and receives an edited value 456 from the user for the color. The value 456 is set into the graphics file's 470 parameter which was marked with the UI metadata 458.

The standard graphics specification 450 thus may define a set of metadata that allow graphics files such as the graphics file 470 to declare a user interface that host applications such as the specification-compliant host application 410 can expose.

The standard graphics specification 450 may include a standard method of binding parameter values 452 supplied by the graphics application 470 with parameters specified by the graphics file 470. For example, a shader may need to perform a calculation on a camera position. The author of the shader may use standardize metadata from the standard graphics specification 450 to indicate to the graphics application 410 to provide information related to the camera position. Thus, the graphics file 470 may be provided with parameter values 452 from the graphics application 410. Metadata may be placed on the graphics file parameters such that they are invisible to the graphics file 470 but visible to the graphics application 410 executing the graphics file 470. Additionally, this data binding may be accomplished without user intervention, though user intervention may also be uses to change values from their reasonable defaults.

Graphics data binding may be factored into three components: First, host application values that the specification-compliant graphics file 470 can use; second, bound parameters that make use of host application values (e.g., parameter values 452); and third, specification-compliant graphics file parameter metadata that may control, for example, the casting and coercion of values being transferred from a host environment to bound parameters.

The host application values 415 may include a collection of application values (as well as their type and structure) exposed to the standard graphics specification-compliant graphics files 470. The host application values 415 collection may be addressed and virtualize using a predefined graphics file syntax. The following are example values collections provided for explanatory purposes only and do not in any way limit the scope of the present invention.

For example, the host application values 415 may include providing access to a host application's virtual clock or time value as follows:

```
struct SpecificationHostParameterValues
{
    // . . .
    struct
    {
        float Now;
        float Last;
        int FrameNumber;
    }
    Time;
    // . . .
} Specification;
```

The value of Now above may be the value of the host applications virtual clock at the point at which the graphics file will be rendered. The value of Last may be the value of Now at the previous render. The value of FrameNumber may be a counter value that is incremented once per rendered frame.

The host application values may additionally provide, for example, access to a cubic environment map as follows:

```
struct SpecificationHostParameterValues
{
    // . . .
    textureCUBE EnvironmentMap;
    // . . .
} Specification;
```

Host applications may provide a valid cube texture if a graphics file attempts to bind to Specification.EnvironmentMap.

The host application values may provide access to a camera currently being rendered. Thus the specification may define a camera as follows:

```
struct SpecificationCamera
{
    float4x4 WorldToView;    // default: Identity
    float4x4 Projection;     // default: Identity
    float2 NearFarClipping;  // default: 1.0, 1000.0
};
```

In the above structure, the near clip plane may be stored in the first element (x element) of NearFarClipping while the far clip plane may be stored in the second element (y element).

The camera from which the scene may be rendered may be available as follows:

```
struct SpecificationHostParameterValues
{
    // ...
    SpecificationCamera Camera;
    // ...
} Specification;
```

Additionally, the host application values may provide access to lights in the environment. Thus the standard graphics specification may define a light as follows:

```
struct SpecificationAmbientLight
{
    float3 Color;       // default: {0, 0, 0}
};
struct SpecificationDirectionalLight
{
    float3 Color;       // default: {0, 0, 0}
    float3 Direction;   // default: {0, 0, 0}
};
struct SpecificationPointLight
{
    float3 Color;       // default: {0, 0, 0}
    float3 Position;    // default: {0, 0, 0}
    float Range;        // default: 0
};
struct SpecificationSpotLight
{
    float3 Color;       // default: {0, 0, 0}
    float3 Position;    // default: {0, 0, 0}
    float Direction;    // default: {0, 0, 0}
    float Range;        // default: 0
    float Theta;        // default: 0
    float Phi;          // default: 0
};
```

The Color, Position, and Direction values may have their intuitive meaning. The Range value may be the distance at which the light has zero effect on the scene. The Theta and Phi values represent the inner and outer cone angles of the spotlight measured in radians.

The set of available lights is a collection of arrays in the SasHostParameterValues as follows:

```
struct SpecificationHostParameterValues
{
    // ...
    SpecificationAmbientLight AmbientLight[ZeroOrMore];
    int NumAmbientLights;
    SpecificationDirectionalLight DirectionalLight[ZeroOrMore];
    int NumDirectionalLights;
    SpecificationPointLight PointLight[ZeroOrMore];
    int NumPointLights;
    SpecificationSpotLight SpotLight[ZeroOrMore];
    int NumSpotLights;
    // ...
} Specification;
```

The value of various Num*Lights values (i.e., NumAmbientLights, etc. . . . ) may be set to the number of lights bound into the associated *Light array. Note that because the graphics file 470 can choose to ignore the Num*Lights value and instead bind to any element of one of the light arrays, the host application 410 may provide a valid binding for elements beyond the number of lights in the array (using the default values defined above).

The above are just some examples of host application values 415 that standard graphics specification-compliant graphics files 470 may use. The examples are shown for example purposes and there may be other values, such as pertaining to shadows or skeleton, for example.

In addition to host application values 415, data binding may include bound parameters that make use of host application values 415. A specification bind address metadata may be an expression that specifies the member or members of the host application values 415 collection to which the associated parameter may be bound. Parameters that have an associated specification bind address annotation may be classified as bound parameters. The syntax of the specification bind address-expression may be defined by a grammar. The following is one example of such a string-based grammar and is provided for explanation purposes only. There may be other grammars as well.

Expression ::=Namespace Step+
Namespace ::='Specification'|Id
Step ::='.'Id ('['Index ']')?
Id ::=[a-z_A-Z][a-z_A-Z0-9]*
Index ::=Integer|'*'
Integer::=[0-9]+

The '*' index token may denote that all elements of the particular host application values array may be returned in the return set. Multiple '*' index tokens may be valid in the same bind expression and may allow graphics files to bind to sub-elements of an array of structures without the need to bind the entire structure itself. For example, the following binding expression may bind color values of a first six lights to a graphics file parameter.

float3 LightColors[6]
<
string SpecificationBindAddress="Specification.Light[*].Color";
>;

If the host application 410 cannot resolve the value of a bind address to a valid value in the specification 450, host application values 415 may instead ignore the existence of that bind address 475. The host application 410 may additionally resolve the value of a bind address that failed to resolve to a bind address within the specification to a non-specification bind address. This behavior may enable authors to create graphics files that bind to extended specification host application values 415 while providing meaningful fallback user interface through the user interface related annotations 480. Additionally, if the host application 410 extends the set of values 415 exposed to the graphics file 470, it may add a top-level namespace (hence the Id in the Namespace production above) and may not be able to augment any other portion of the specification host application values 415 collection.

A third component of specification data binding involving transferring values between the specification host application values 415 and a bound parameter are rules by which values may be manipulated during the assignment of the value into the bound parameter. The host application 410 may guarantee that the values of graphics file parameters with valid specification bind address annotations (i.e., all bound parameters) are updated before the host application 410 invokes any rendering via the specification-compliant graphics file 470.

Because the type of the specification host application values 415 and the bound parameter type might not be the same, the standard graphics specification 450 may appropriately define how values are coerced between different types. The specification may support a selection of data modifiers that can affect the value being transferred from the specification host application values to a bound parameter.

Figure 5:
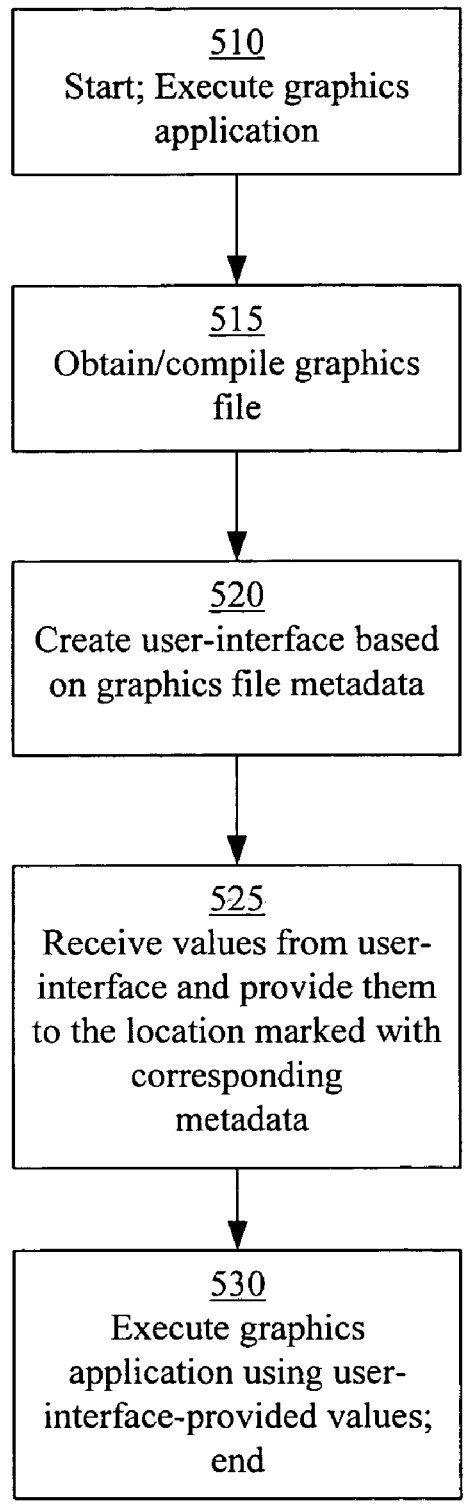
FIG. 5 depicts a flow diagram of an example method for using a standard graphics specification-compliant graphics file in a standard graphics specification-compliant application exposing a user interface.

FIG. 5 depicts a flow diagram of an example method 500 for using a standard graphics specification-compliant graphics file in a standard graphics specification-compliant application exposing a user interface. The method may commence at step 510 with execution of the graphics application on a host. At step 515, the graphics file may be loaded, which may, at step 520 cause the graphics application to create user-interface exposure consistent with annotations in the graphics file. Such exposure may include asking a user for input regarding color or texture, and may be in the form of asking the user to enter an integer, to choose from an exposed color palate, or to select from a sliding bar scale. At step 525, the user may make the appropriate selection for each exposed user-interface value and the value is returned to the graphics file parameter whose metadata requested the user-interface. The graphics application may then be further executed to render a display based on the user's selections at step 530.

Figure 6:
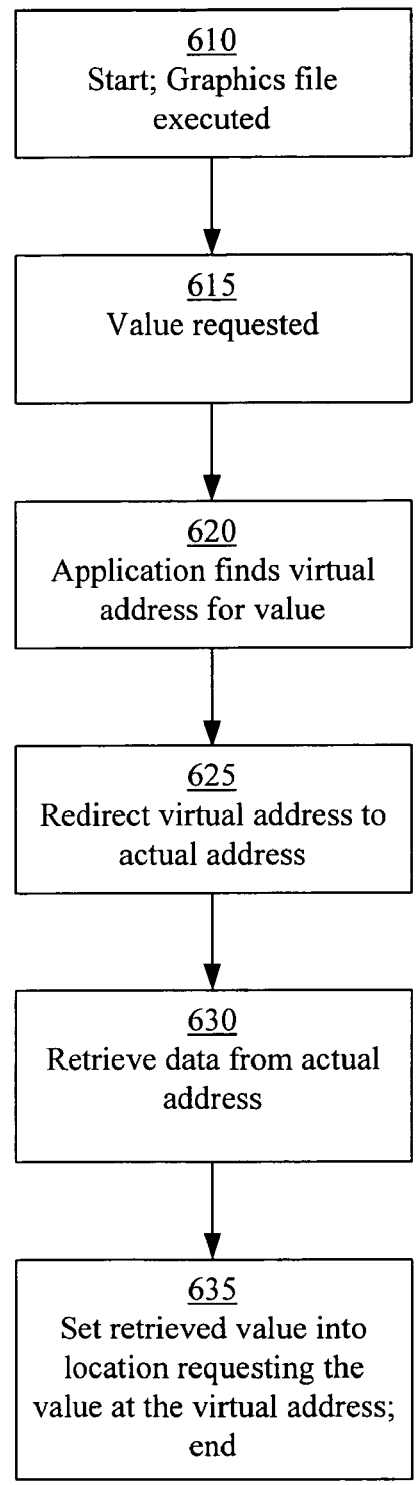
FIG. 6 depicts a flow diagram of an example method for using a standard graphics specification-compliant graphics file in a standard graphics specification-compliant application exposing values to be bound to parameters of the file.

FIG. 6 is a flow diagram of an example method 600 for using a standard graphics specification-compliant graphics file in a standard graphics specification-compliant application exposing values for to be bound to parameters of the file. The method 600 may enable application-related values to be consumed by graphics files that are compliant with the specification. Such consumption may be completed without user intervention. That is, the graphics application may provide the values to be bound to an address without requiring the user to be involved in any of the transactions. Thus the application may "understand" the markup, such as semantics or annotation, in the graphics files because both conform to the standard graphics specification.

The method 600 may commence at step 610 with execution of a graphics file by a graphics application. Both the graphics file and the application may conform to a standard graphics specification. At step 615, the graphics application may be requested to provide a value. For example, the application may be requested to provide a value for "LightColor" as follows:

float3 LightColor
    <
    string
    SpecificationBindAddress="Specification.PointLight[0].Color";
    >;

Thus the application may be requested to provide a value at the address representing the color of a light called "PointLight[0]." The application may "know" the virtual address of a value representing a color of the PointLight PointLight[0].Color. At step 620, the application may provide the value at the virtual address. As a plurality of "values" may reside in a virtual address, the graphics application 410 may be requested to provide the actual address associated with the virtual address from a given graphics file 470 to retrieve the value at step 625. The graphics file may be any representation of a file in a runtime environment. For example, the graphics file may be an instantiation, duplication, reference, instance, or some other representation created from another method of reuse. Of course, the application may alternatively provide a default value representing the color of the PointLight PointLight[0]. At step 630, the value may be retrieved from the actual address and at step 635, the value may be stored in the parameter with the bind address in the graphics file. In the above example, the value may be bound to the bind address called "Specification.PointLight[0].Color." Thus the graphics application may provide the requested value for the graphics file without user intervention, though user intervention or "smart" application code may also be used to change values from their reasonable defaults and cause multiple actual addresses per virtual address.

The methods of the present invention may be implemented in hardware, software or, where appropriate, a combination of both. Thus, the methods and apparatus of the present invention, or certain aspects or portions thereof, may take the form of program code (i.e., instructions) and data embodied in computer readable medium. A processor that executes program code for performing the steps of the methods of the invention, as described in FIGS. 2-6 and as claimed, constitute a computer system that embodies the present invention. In the case of program code execution on programmable computers, the computing device will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the specific examples in conjunction with the various figures, it is to be understood that other embodiments may be used or modifications and additions may be made to the described embodiments for performing the same function of the present invention without deviating therefrom. The examples are offered in explanation of the invention and are in no way intended to limit the scope of the invention as defined in the claims. In summary, in no way is the present invention limited to the examples provided and described herein. Therefore, the present invention should not be limited to any single embodiment, but rather should be construed in breadth and scope in accordance with the appended claims.

What is claimed is:

1. A method, comprising:
    creating a graphics file comprising program code and data;
    incorporating metadata in the graphics file to describe at least a portion of the program code and data, the metadata conforming to a standard graphics specification;
    providing the graphics file to a runtime environment for execution by an application; and
    establishing a parameter in the graphics file, the parameter associated with a binding annotation specifying a bind address, wherein the application conforms to the standard graphics specification and defines a value to be bound to the parameter, and
    wherein the graphics file is created independent of the runtime environment and wherein the value is associated with a virtual address and the virtual address is associated with an actual address that the graphics application has associated with the actual value.

2. The method of claim 1, wherein the graphics file is capable of execution by the application in part because the graphics file is in a format understood by the application and in part because it and the application conform to the graphics specification.

3. The method of claim 1, wherein the metadata comprises an annotation.

4. The method of claim 3, wherein the metadata comprises a user-interface annotation.

5. The method of claim 3, wherein the metadata comprises a binding annotation.

6. The method of claim 1, wherein the application comprises a shader authoring tool.

7. The method of claim 1, wherein the application comprises any application that uses shaders.

8. A method, comprising:
creating a graphics file comprising program code and data;
establishing a parameter in the graphics file, the parameter associated with a binding annotation specifying a bind address, wherein the bind address is associated with a virtual address and the virtual address is associated with a runtime representation of the graphics file;
incorporating metadata in the graphics file to describe at least a portion of the program code and data, the metadata conforming to a standard graphics specification; and
providing the graphics file to a runtime environment for execution by an application,
wherein the application conforms to the standard graphics specification, and
wherein the graphics file is created independent of the runtime environment.

9. The method of claim 8, wherein the metadata comprises an annotation.

10. The method of claim 8, wherein the graphics file is capable of execution by the application in part because the graphics file is in a format understood by the application and in part because it and the application conform to the graphics specification.

11. A method, comprising:
creating an application that conforms with standards of a graphics specification and that comprises program code and data for executing a graphics file to be provided to the application;
establishing a parameter in the graphics file, the parameter associated with a binding annotation specifying a bind address; and
defining a value in the application to be bound to a the parameter of the graphics file,
wherein the graphics file comprises program code, data, and metadata, the metadata conforming to standards of the graphics specification, and
wherein the value is associated with a virtual address and the virtual address is associated with an actual address that the application has associated with the actual value and wherein the graphics file is created independent of the runtime environment and is capable of execution by the application because it and the application conform to the graphics specification.

12. The method of claim 11, wherein the application conforms to runtime environment standards of the graphics specification.

13. The method of claim 11, wherein the metadata comprises an annotation.

14. The method of claim 13, wherein the annotation is a binding annotation.

15. The method of claim 11, wherein the parameter is associated with a bind address through a binding annotation.

16. A computer-readable storage medium having program code stored thereon that, when executed by a computer system, causes the computer system to:
execute a graphics file;
establish a parameter in the graphics file wherein the parameter is associated with a binding annotation specifying a bind address;
define a value to be bound to the parameter;
receive a request for the value for the parameter of the graphics file;
retrieve a virtual address associated with the value, wherein the virtual address is associated with an actual address that the graphics application has associated with the value; and
retrieve the value from the actual address associated with the virtual address.

17. The computer-readable storage medium of claim 16, having further program code stored thereon that, when executed by the application, causes the application to:
retrieve the value addressable by bind address; and
store it in the parameter with that bind address.

18. The computer-readable storage medium of claim 16, wherein the graphics file and the computer readable medium conform to a standard graphics specification, and wherein the graphics file is created independent of the computer readable medium and the computer readable medium is created independent of the graphics file.

19. The computer-readable storage medium of claim 16, wherein the parameter is associated with a binding annotation.

20. A method, comprising:
creating an application that conforms with standards of a graphics specification and that comprises program code and data for executing a graphics file to be provided to the application;
establishing a parameter in the graphics file, the parameter associated with a binding annotation specifying a bind address, wherein the bind address is associated with a virtual address and the virtual address is associated with a runtime representation of the graphics file; and
defining a value in the application to be bound to the parameter of the graphics file,
wherein the graphics file comprises program code, data, and metadata, the metadata conforming to standards of the graphics specification, and
wherein the graphics file is created independent of the runtime environment and is capable of execution by the application because it and the application conform to the graphics specification.

21. The method of claim 20, wherein the application conforms to runtime environment standards of the graphics specification.

22. The method of claim 20, wherein the metadata comprises an annotation.

23. The method of claim 20, wherein the parameter is associated with a bind address through a binding annotation.

24. A computer-readable storage medium having program code stored thereon that, when executed by a computer system, causes the computer system to:
execute a graphics file;
establish a parameter in the graphics file wherein the parameter is associated with a binding annotation specifying a bind address, wherein the bind address is associated with a virtual address and the virtual address is associated with a runtime representation of the graphics file;
receive a request for a value for the parameter of the graphics file;
retrieve the virtual address, the virtual address being further associated with the value; and
retrieve the value from an actual address associated with the virtual address.

25. The computer-readable storage medium of claim 24, having further program code stored thereon that, when executed by the application, causes the application to:

retrieve the value addressable by bind address; and store it in the parameter with that bind address.

26. The computer-readable storage medium of claim 24, wherein the graphics file and the computer readable medium conform to a standard graphics specification, and wherein the graphics file is created independent of the computer readable medium and the computer readable medium is created independent of the graphics file.

27. The computer-readable storage medium of claim 24, wherein the parameter is associated with a binding annotation.

* * * * *